(12) United States Patent
Kim

(10) Patent No.: US 10,812,743 B2
(45) Date of Patent: Oct. 20, 2020

(54) IMAGE SENSING DEVICE

(71) Applicant: SK hynix Inc., Gyeonggi-do (KR)

(72) Inventor: Tae-Gyu Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/182,018

(22) Filed: Nov. 6, 2018

(65) Prior Publication Data
US 2019/0320129 A1    Oct. 17, 2019

(30) Foreign Application Priority Data

Apr. 17, 2018    (KR) .......................... 10-2018-0044350

(51) Int. Cl.
*H04N 5/365*    (2011.01)
*H04N 5/369*    (2011.01)

(52) U.S. Cl.
CPC ......... *H04N 5/3651* (2013.01); *H04N 5/3698* (2013.01)

(58) Field of Classification Search
CPC .... H04N 5/3651; H04N 5/3698; H04N 5/357; H04N 5/378; H04N 5/3745; H04N 5/37455

See application file for complete search history.

(56) References Cited

U.S. PATENT DOCUMENTS

| | | | |
|---|---|---|---|
| 2009/0051576 A1* | 2/2009 | Dedic | H03K 17/04123 341/136 |
| 2009/0135041 A1* | 5/2009 | Han | H03M 1/46 341/172 |
| 2014/0252208 A1* | 9/2014 | Fujinaka | H04N 5/363 250/208.1 |
| 2015/0130971 A1* | 5/2015 | Oike | H03M 1/186 348/241 |

FOREIGN PATENT DOCUMENTS

| | | |
|---|---|---|
| KR | 101012684 | 2/2011 |
| KR | 101358744 | 2/2014 |

* cited by examiner

*Primary Examiner* — Sinh Tran
*Assistant Examiner* — Zhenzhen Wu
(74) *Attorney, Agent, or Firm* — IP & T Group LLP

(57) ABSTRACT

An image sensing device includes a pixel array suitable for generating a pixel signal, a tracking circuit suitable for generating a tracking signal whose voltage level gradually converges to a voltage level of the pixel signal by selectively using any one of a first convergence voltage where an amount of decrease in a voltage level gradually decreases during a plurality of tracking periods and a second convergence voltage where an amount of increase in a voltage level gradually decreases during the tracking periods for each tracking period, based on the pixel signal and first and second comparison result signals, and a signal generation circuit suitable for generating the first and second comparison result signals and an image signal based on the pixel signal and the tracking signal.

17 Claims, 3 Drawing Sheets

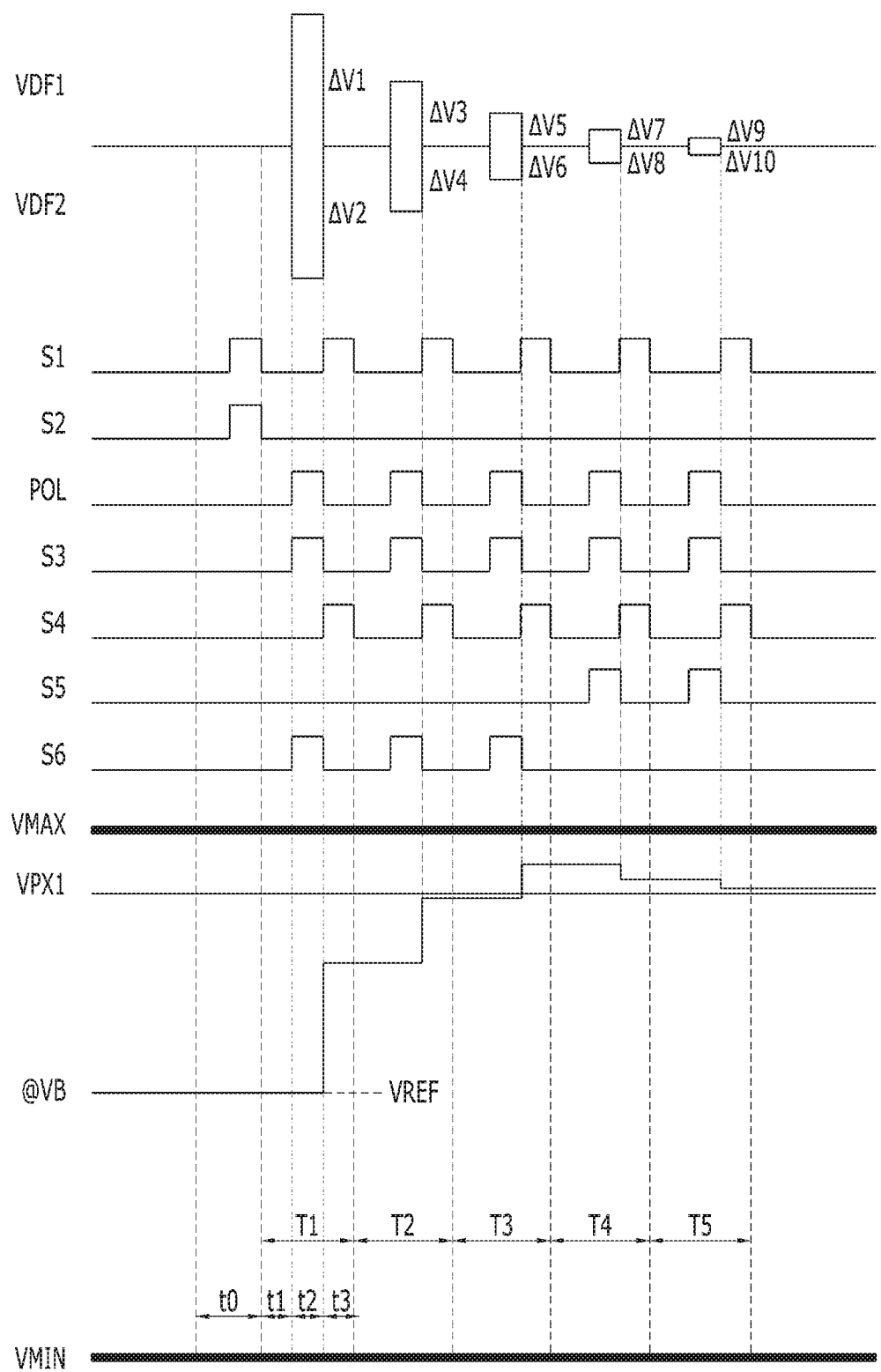

IMAGE SENSING DEVICE

CROSS-REFERENCE TO RELATED APPLICATIONS

This application claims priority under 35 U.S.C. § 119(a) to Korean Patent Application No. 10-2018-0044350, filed on Apr. 17, 2018, the disclosure of which is incorporated herein by reference in its entirety.

BACKGROUND

1. Field

Exemplary embodiments of the present invention relate generally to a semiconductor device and, more particularly, to an image sensing device.

2. Description of the Related Art

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow both analog and digital control circuits to be integrated in a single integrated circuit (IC), making CMOS image sensors the most widely used type of image sensor.

SUMMARY

Various embodiments of the present invention are directed to an image sensing device capable of performing an optimized operation when pixel signals are converted into image signals.

In accordance with an embodiment of the present invention, an image sensing device includes: a pixel array suitable for generating a pixel signal; a tracking circuit suitable for generating a tracking signal whose voltage level gradually converges to a voltage level of the pixel signal by selectively using any one of a first convergence voltage where an amount of decrease in a voltage level gradually decreases during a plurality of tracking periods and a second convergence voltage where an amount of increase in a voltage level gradually decreases during the tracking periods for each tracking period, based on the pixel signal and first and second comparison result signals; and a signal generation circuit suitable for generating the first and second comparison result signals and an image signal based on the pixel signal and the tracking signal.

The tracking circuit may include: a first signal processing unit suitable for reflecting any one of the first and second convergence voltages in a first comparison input node based on the first and second comparison result signals; a second signal processing unit suitable for transmitting the pixel signal to the first comparison input node or coupling the first comparison input node to a first comparison output node based on first and third control signals; a third signal processing unit suitable for storing the tracking signal in a second comparison input node; and a fourth signal processing unit suitable for reflecting a reference voltage having a constant voltage level in the second comparison input node or coupling the second comparison input node to a second comparison output node based on second and fourth control signals.

The first signal processing unit may include: a switching element coupled between an input node of the first convergence voltage and a first coupling node, and switched on and off based on the first comparison result signal; a switching element coupled between an input node of the second convergence voltage and the first coupling node, and switched on and off based on the second comparison result signal; and a storing element coupled between the first coupling node and the first comparison input node.

The second signal processing unit may include: a first switching element coupled between an input node of the pixel signal and the first comparison input node, and switched on and off based on the first control signal; and a second switching element coupled between the first comparison input node and the first comparison output node, and switched on and off based on the third control signal.

The third signal processing unit may include: a storing element coupled between a supply node of a ground voltage and the second comparison input node.

The fourth signal processing unit may include: a first switching element coupled between an input node of the reference voltage and the second comparison input node, and switched on and off based on the second control signal; and a second switching element coupled between the second comparison input node and the second comparison output node, and switched on and off based on the fourth control signal.

The signal generation circuit may include: a comparison unit coupled between the first and second comparison input nodes and the first and second comparison output nodes, and suitable for outputting first and second comparison output signals to the first and second comparison output nodes, respectively, the first and second comparison output signals being obtained by comparing the pixel signal with the tracking signal; an amplification unit suitable for amplifying the first and second comparison output signals; and a control logic unit suitable for generating the first and second comparison result signals and the image signal based on a result of the amplification of the amplification unit.

The comparison unit may switch polarities of the first and second comparison input nodes with each other and switch polarities of the first and second comparison output nodes with each other, for each tracking period based on a polarity change signal.

The first convergence voltage may pulse in a first direction on a basis of a predetermined voltage level for each tracking period, and the second convergence voltage may pulse in a second direction opposite to the first direction on a basis of the predetermined voltage level for each tracking period.

In accordance with an embodiment of the present invention, an image sensing device includes: a voltage generator suitable for generating a first global convergence voltage where an amount of decrease in a voltage level gradually decreases during a plurality of tracking periods, a second global convergence voltage where an amount of increase in a voltage level gradually decreases during the tracking periods, and a global reference voltage having a constant voltage level; a pixel array suitable for generating a plurality of pixel signals; and a plurality of signal converters suitable for generating a plurality of image signals based on the pixel signals, the first and second global convergence voltages, the global reference voltage and a plurality of global control signals.

Each of the signal converters may include: a tracking circuit suitable for generating tracking signals respectively based on the global control signals, first and second comparison result signals, each of the pixel signals, the first and second global convergence voltages and the global reference voltage; and a signal generation circuit suitable for generating the first and second comparison result signals and each of the image signals based on each of the pixel signals and each of the tracking signals.

The tracking circuit may selectively use any one of the first and second global convergence voltage for each tracking period to generate each of the tracking signals whose voltage level gradually converges from a voltage level of the global reference voltage to a voltage level of each of the pixel signal.

The tracking circuit may include: a first signal processing unit suitable for reflecting any one of the first and second global convergence voltages in a first comparison input node based on the first and second comparison result signals; a second signal processing unit suitable for reflecting each of the pixel signals in the first comparison input node or coupling the first comparison input node to a first comparison output node based on first and second global control signals among the global control signals; a third signal processing unit suitable for storing each of the tracking signals in a second comparison input node; and a fourth signal processing unit suitable for reflecting the global reference voltage in the second comparison input node or coupling the second comparison input node to a second comparison output node based on third and fourth global control signals among the global control signals.

The first signal processing unit may include: a switching element coupled between an input node of the first global convergence voltage and a first coupling node, and switched on and off based on the first comparison result signal; a switching element coupled between an input node of the second global convergence voltage and the first coupling node, and switched on and off based on the second comparison result signal; and a storing element coupled between the first coupling node and the first comparison input node.

The second signal processing unit may include: a first switching element coupled between an input node of each of the pixel signals and the first comparison input node, and switched on and off based on the first global control signal; and a second switching element coupled between the first comparison input node and the first comparison output node, and switched on and off based on the second global control signal.

The third signal processing unit may include: a storing element coupled between a supply node of a ground voltage and the second comparison input node.

The fourth signal processing unit may include: a first switching element coupled between an input node of the global reference voltage and the second comparison input node, and switched on and off based on the second global control signal; and a second switching element coupled between the second comparison input node and the second comparison output node, and switched on and off based on the fourth global control signal.

The signal generation circuit may include: a comparison unit coupled between the first and second comparison input nodes and the first and second comparison output nodes, and suitable for outputting first and second comparison output signals to the first and second comparison output nodes, respectively, the first and second comparison output signals being obtained by comparing each of the pixel signals with each of the tracking signals; an amplification unit suitable for amplifying the first and second comparison output signals; and a control logic unit suitable for generating the first and second comparison result signals and each of the image signals based on a result of the amplification of the amplification unit.

The comparison unit may switch polarities of the first and second comparison input nodes with each other and switch polarities of the first and second comparison output nodes with each other, for each tracking period based on a global polarity change signal.

The first global convergence voltage may pulse in a first direction on a basis of a predetermined voltage level for each tracking period, and the second global convergence voltage may pulse in a second direction opposite to the first direction on a basis of the predetermined voltage level for each tracking period.

BRIEF DESCRIPTION OF THE DRAWINGS

FIG. 3 is a timing diagram illustrating an operation of an image sensing device in accordance with an embodiment of the present invention.

DETAILED DESCRIPTION

Various embodiments of the present invention will be described below, in more detail, with reference to the accompanying drawings. These embodiments are provided so that this disclosure is thorough and complete. All "embodiments" referred to in this disclosure refer to embodiments of the inventive concept disclosed herein. The embodiments presented are merely examples and are not intended to limit the scope of the invention.

Moreover, it is noted that the terminology used herein is for the purpose of describing the embodiments only and is not intended to be limiting of the invention. As used herein, unless the context clearly indicates otherwise, singular forms are intended to include the plural forms as well. It will be further understood that the terms "comprises," "comprising," "includes," and/or "including," when used in this specification, indicate the presence of stated features but do not preclude the presence or addition of one or more other non-stated features. As used herein, the term "and/or" indicates any and all combinations of one or more of the associated listed items. It is also noted that, in this specification, "connected/coupled" refers to one component not only directly coupling another component but also indirectly coupling another component through an intermediate component.

It will be understood that the terms "first", "second", "third", and so on may be used to describe various elements, however, these elements are not limited by these terms; these terms are used to distinguish one element from another element. Thus, an element described as a first element described could also be termed as a second or third element without departing from the spirit and scope of the present invention.

The drawings are not necessarily to scale, and, in some instances, proportions may have been exaggerated in order to clearly illustrate features of the embodiments.

Figure 1:
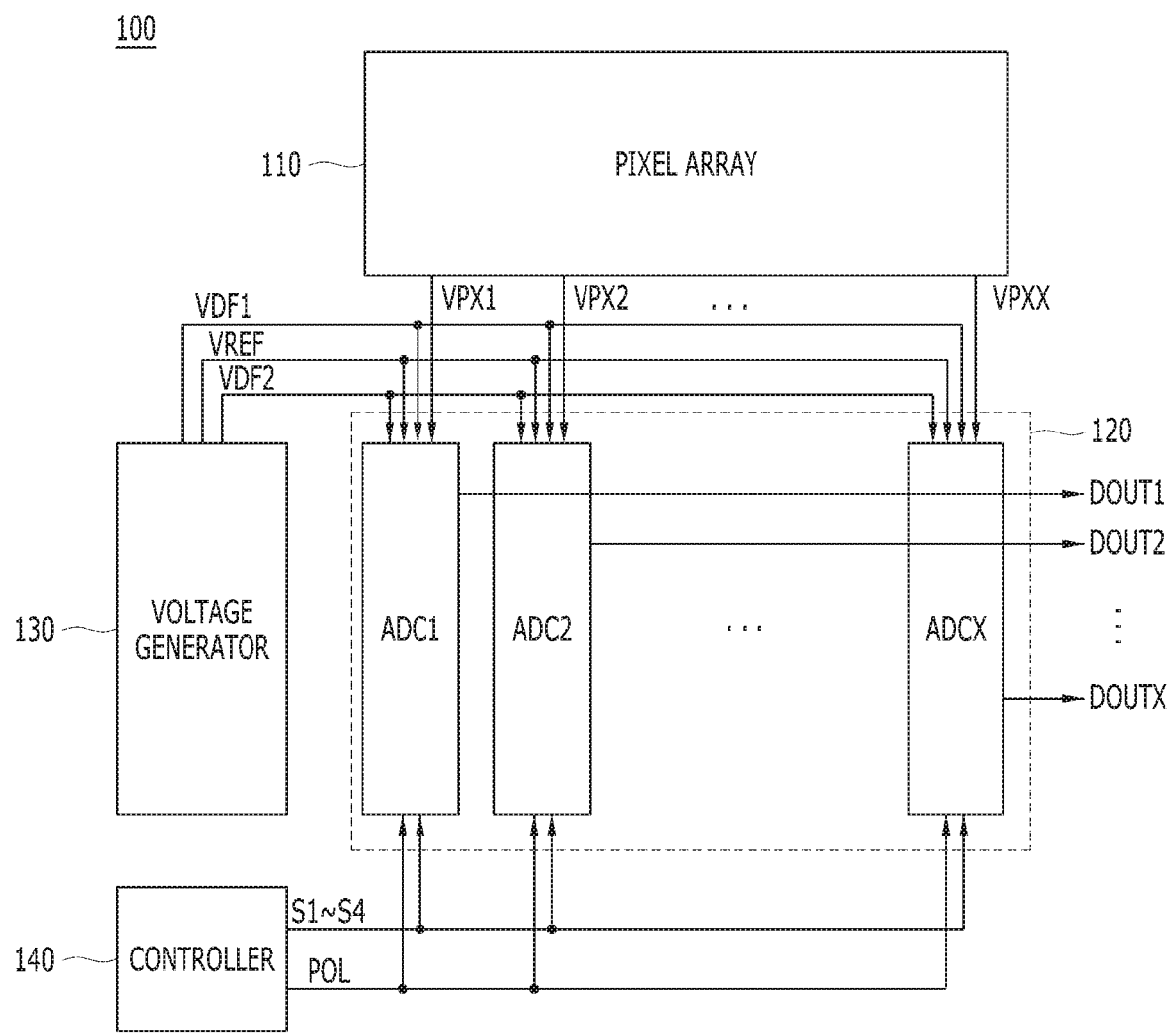
FIG. 1 is a block diagram illustrating an image sensing device in accordance with an embodiment of the present invention.

FIG. 1 is a block diagram illustrating an image sensing device 100 in accordance with an embodiment of the present invention.

Referring to FIG. 1, the image sensing device 100 may include a pixel array 110, a readout block 120, a voltage generator 130, and a controller 140.

The pixel array 110 may include a plurality of pixels (not illustrated). The pixel array 110 may be a two-dimensional array with the pixels arranged in row and column directions. The pixel array 110 may simultaneously generate a plurality of pixel signals VPX1 to VPXX from the pixels of a single row at a time. Each of the pixel signals VPX1 to VPXX may be an analog signal. The readout block 120 may generate a plurality of image signals DOUT1 to DOUTX based on the pixel signals VPX1 to VPXX, first and second global convergence voltages VDF1 and VDF2, a global reference voltage VREF, first to fourth global control signals S1 to S4 and a global polarity change signal POL. Each of the image signals DOUT1 to DOUTX may be a digital signal. The readout block 120 may include a plurality of signal converters ADC1 to ADCX.

The voltage generator 130 may generate the first and second global convergence voltages VDF1 and VDF2 and the global reference voltage VREF. The first global convergence voltage VDF1 may have a decreasing pattern in which an amount of decrease in a voltage level gradually decreases during a plurality of tracking periods. For example, the first global convergence voltage VDF1 may have a pattern in which an amount of change of the voltage level gradually decreases during the tracking periods, and may pulse in a first direction on a basis of the voltage level for each tracking period. The second global convergence voltage VDF2 may have an increasing pattern in which an amount of increase in the voltage level gradually decreases during the tracking periods. For example, the second global convergence voltage VDF2 may have a pattern in which an amount of change of the voltage level gradually decreases during the tracking periods, and may pulse in a second direction opposite to the first direction on a basis of the voltage level for each tracking period. The global reference voltage VREF may have a constant voltage level.

The controller 140 may generate the first to fourth global control signals S1 to S4 and the global polarity change signal POL.

Figure 2:
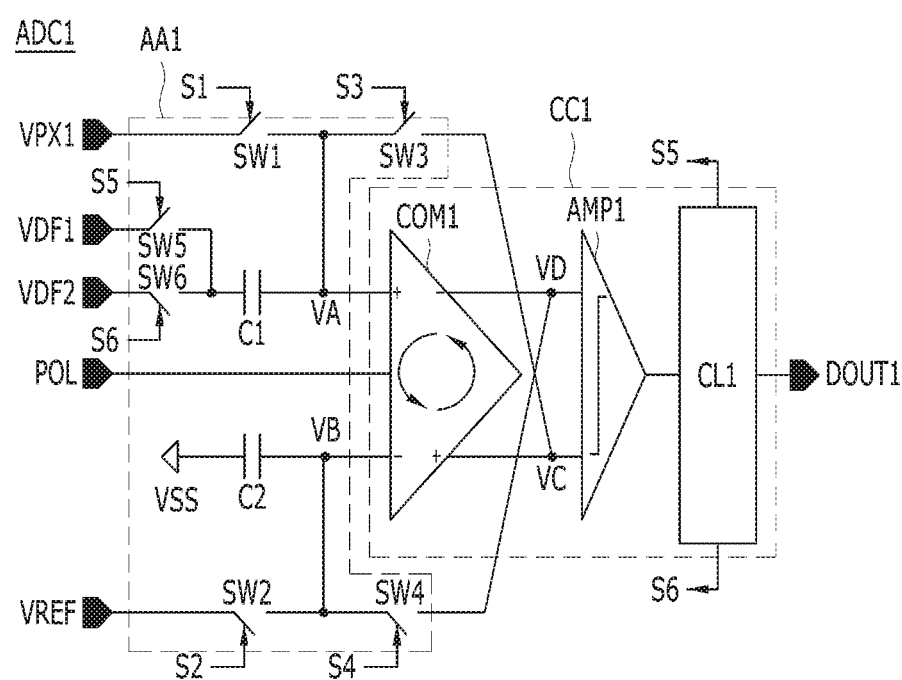
FIG. 2 is a circuit diagram illustrating a signal converter in accordance with an embodiment of the present invention.

FIG. 2 is a circuit diagram illustrating a signal converter in accordance with an embodiment of the present invention. For example, FIG. 2 illustrates the first signal converter ADC1 among the plurality of signal converters ADC1 to ADCX shown in FIG. 1.

Referring to FIG. 2, the first signal converter ADC1 may selectively use any one of the first and second global convergence voltages VDF1 and VDF2 for each tracking period, thereby generating a first tracking signal (not illustrated). The voltage level of the first tracking signal gradually converges from the global reference voltage VREF to a voltage level of the first pixel signal VPX1. The first signal converter ADC1 may generate the first image signal DOUT1 based on the first tracking signal. The first signal converter ADC1 may include a tracking circuit AA1 and a signal generation circuit CC1.

The tracking circuit AA1 may generate the first tracking signal based on the first to fourth global control signals S1 to S4, first and second comparison result signals S5 and S6, the first pixel signal VPX1, the global reference voltage VREF and the first and second global convergence voltages VDF1 and VDF2. The tracking circuit AA1 may include a first signal processing unit including elements SW5, SW6 and C1, a second signal processing unit including elements SW1 and SW3, a third signal processing unit including an element C2, and a fourth signal processing unit including elements SW2 and SW4.

The first signal processing unit including the elements SW5, SWG and C1 may reflect any one of the first and second global convergence voltages VDF1 and VDF2 in a first comparison input node VA for each tracking period based on the first and second comparison result signals S5 and S6. The first signal processing unit may include a fifth switching element SW5, a sixth switching element SW6, and a first storing element C1. The fifth switching element SW5 may be coupled between an input node of the first global convergence voltage VDF1 and a first coupling node. The fifth switching element SW5 may be switched on and off based on the first comparison result signal S5. The sixth switching element SW6 may be coupled between an input node of the second global convergence voltage VDF2 and the first coupling node. The sixth switching element SW6 may be switched on and off based on the second comparison result signal S6. The first storing element C1 may be coupled between the first coupling node and the first comparison input node VA. The first storing element C1 may include a capacitor.

The second signal processing unit including the elements SW1 and SW3 may reflect the first pixel signal VPX1 in the first comparison input node VA or couple the first comparison input node VA to a first comparison output node VC based on the first and third global control signals S1 and S3. The elements SW1 and SW3 may be first and third switching elements, respectively. The first switching element SW1 may be coupled between an input node of the first pixel signal VPX1 and the first comparison input node VA. The first switching element SW1 may be switched on and off based on the first global control signal S1. The third switching element SW3 may be coupled between the first comparison input node VA and the first comparison output node VC. The third switching element SW3 may be switched on and off based on the third global control signal S3.

The third signal processing unit including the element C2 may store the first tracking signal in a second comparison input node VB. The third signal processing unit may include a second storing element C2. The second storing element C2 may be coupled between a supply node of a ground voltage VSS and the second comparison input node VB. The element C2 may include a capacitor.

The fourth signal processing unit including the elements SW2 and SW4 may reflect the global reference voltage VREF in the second comparison input node VB. The fourth signal processing unit may couple the second comparison input node VB to a second comparison output node VD based on the second and fourth global control signals S2 and S4. The elements SW2 and SW4 may be a second and a fourth switching element, respectively. The second switching element SW2 may be coupled between an input node of the global reference voltage VREF and the second comparison input node VB. The second switching element SW2 may be switched on and off based on the second global control signal S2. The fourth switching element SW4 may be coupled between the second comparison input node VB and the second comparison output node VD. The fourth switching element SW4 may be switched on and off based on the fourth global control signal S4.

The signal generation circuit CC1 may generate first and second comparison result signals S5 and S6 and the first image signal DOUT1 based on the first pixel signal VPX1 and the first tracking signal. The signal generation circuit CC1 may include a comparison unit COM1, an amplification unit AMP1, and a control logic unit CL1.

The comparison unit COM1 may be coupled between the first and second comparison input nodes VA and VB and the first and second comparison output nodes VC and VD. The comparison unit COM1 may compare the first pixel signal VPX1 applied to the first comparison input node VA with the first tracking signal generated from the second comparison input node VB. The comparison unit COM1 may output first and second comparison output signals obtained by a result of the comparison through the first and second comparison output nodes VC and VD.

The amplification unit AMP1 may receive the first and second comparison output signals through the first and second comparison output nodes VC and VD and amplify the first and second comparison output signals. In an embodiment the amplification unit AMP1 may be a differential amplifier, however, we note that the present invention may not be limited in this way and other suitable amplifiers may be employed.

The control logic unit CL1 may generate the first and second comparison result signals S5 and S6 and the first image signal DOUT1 based on a result of the amplification of the amplification unit AMP1, that is, at least one of the amplified first and second comparison output signals.

Hereinafter, an operation of the image sensing device 100 having the aforementioned structure in accordance with an embodiment of the present invention is described with reference to FIG. 3.

FIG. 3 is a timing diagram illustrating an operation of an image sensing device in accordance with an embodiment of the present invention, for example, the image sensing device 100 shown in FIG. 1. For convenience, FIG. 3 illustrates just signals related to the first signal converter ADC1 of FIG. 2.

Referring to FIG. 3, the pixel array 110 may generate the first pixel signal VPX1. For example, the first pixel signal VPX1 may have a voltage level within a predetermined range from VMIN to VMAX. Hereinafter, it is described as an example that the first pixel signal VPX1 has a voltage level greater than the global reference voltage VREF.

The voltage generator 130 may generate the first global convergence voltage VDF1, the second global convergence voltage VDF2 and the global reference voltage VREF. Amounts of decrease $\Delta V1$, $\Delta V3$, $\Delta V5$, $\Delta V7$ and $\Delta V9$ in a voltage level of the first global convergence voltage VDF1 may gradually decrease during a plurality of tracking periods T1 to T5. Amounts of increase $\Delta V2$, $\Delta V4$, $\Delta V6$, $\Delta V8$ and $\Delta V10$ in a voltage level of the second global convergence voltage VDF2 may gradually decrease during the tracking periods T1 to T5. The global reference voltage VREF may have a medium voltage level in the predetermined ranges VMIN to VMAX.

Although it is described in the embodiment of the present invention that the first and second global convergence voltages VDF1 and VDF2 have patterns that pulse in opposite directions on a basis of the predetermined voltage level during the tracking periods T1 to T5, the inventive concept is not limited to this. In other words, the first and second global convergence voltages VDF1 and VDF2 may have any pattern as long as the amounts of decrease $\Delta V1$, $\Delta V3$, $\Delta V5$, $\Delta V7$ and $\Delta V9$ in the voltage level of the first global convergence voltage VDF1 and the amounts of increase $\Delta V2$, $\Delta V4$, $\Delta V6$, $\Delta V8$ and $\Delta V10$ in the voltage level of the second global convergence voltage VDF2 gradually decrease during the tracking periods T1 to T5. For example, the first and second global convergence voltages VDF1 and VDF2 have stepped patterns that vary in opposite directions during the tracking periods T1 to T5.

The first signal converter ADC1 may generate the first image signal DOUT1 based on the first pixel signal VPX1, the first and second global convergence voltages VDF1 and VDF2, the global reference voltage VREF and the first to fourth global control signals S1 to S4. This is described in more detail as follows.

During an initial period t0, the tracking circuit AA1 may apply the first pixel signal VPX1 to the first comparison input node VA based on the first global control signal S1 and apply the global reference voltage VREF to the second comparison input node VB based on the second global control signal S2.

During the first tracking period T1, the signal generation circuit CC1 may generate the tracking signal whose voltage level converges from a voltage level of the global reference voltage VREF to the voltage level of the first pixel signal VPX1 through the second comparison input node VB. The signal generation circuit CC1 may generate the tracking signal based on the first pixel signal VPX1 applied to the first comparison input node VA and the global reference voltage VREF applied to the second comparison input node VB. The first tracking period T1 may include first to third control periods t1 to t3.

During the first control period t1, the signal generation circuit CC1 may compare the first pixel signal VPX1 applied to the first comparison input node VA with the global reference voltage VREF applied to the second comparison input node VB.

During the second control period t2, the signal generation circuit CC1 may generate the first and second comparison result signals S5 and S6 corresponding to a result of the comparison. For example, since the voltage level of the first pixel signal VPX1 is greater than the voltage level of the global reference voltage VREF, the signal generation circuit CC1 may activate the second comparison result signal S6 among the first and second comparison result signals S5 and S6 during the second control period t2. In addition, during the second control period t2, the signal generation circuit CC1 may switch polarities of the first and second comparison input nodes VA and VB and polarities of the first and second comparison output nodes VC and VD based on the global polarity change signal POL having a logic high level so that a voltage level of the second comparison input node VB may be written to the first comparison input node VA. During the second control period t2, the comparison unit COM1 included in the signal generation circuit CC1 may operate as a buffer as the third switching element SW3 becomes short based on the third global control signal S3 having a logic high level. For this reason, the voltage level of the second comparison input node VB may be written to the first comparison input node VA. In addition, during the second control period t2, the tracking circuit AA1 may increase a voltage level of the first comparison input node VA by the amount of increase $\Delta V2$ in the second global convergence voltage VDF2 based on the second comparison result signal S6 having a logic high level.

During the third control period t3, the signal generation circuit CC1 may change the polarities of the first and second comparison input nodes VA and VB to be original and change the polarities of the first and second comparison output nodes VC and VD to be original based on the global polarity signal POL having a logic low level. Thus, the voltage level of the first comparison input node VA may be written to the second comparison input node VB. In addition, during the third control period t3, the tracking circuit AA1 may apply the first pixel signal VPX1 to the first comparison input node VA again based on the first global control signal S1 having a logic high level.

During the remaining tracking periods T2 to T5, operations performed during the first tracking period T1 as described above are repeatedly performed so that the tracking signal whose voltage level gradually converges to the first pixel signal VPX1 may be generated through the second comparison input node VB.

As is apparent from the embodiment of the present disclosure, an advantage is provided in that a tracking signal whose voltage level gradually converges to a voltage level of a pixel signal while the voltage level of the pixel signal maintains uniformity may be generated through an optimized signal conversion operation.

As the optimized signal conversion operation is performed when the pixel signal is converted into an image signal, a conversion time and power consumption may be reduced, and the image sensing device may be free or substantially free of noise.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the spirit and/or scope of the present invention as defined by the following claims.

What is claimed is:

1. An image sensing device, comprising:
   a pixel array suitable for generating a pixel signal;
   a tracking circuit suitable for generating a tracking signal whose voltage level gradually converges to a voltage level of the pixel signal by selectively using any one of a first convergence voltage where an amount of decrease in a voltage level gradually decreases during a plurality of tracking periods and a second convergence voltage where an amount of increase in a voltage level gradually decreases during the tracking periods for each tracking period, based on the pixel signal, and first and second comparison result signals; and
   a signal generation circuit suitable for generating the first and second comparison result signals and an image signal based on the pixel signal and the tracking signal,
   wherein the tracking circuit includes:
   a first signal processing unit suitable for reflecting any one of the first and second convergence voltages in a first comparison input node based on the first and second comparison result signals;
   a second signal processing unit suitable for transmitting the pixel signal to the first comparison input node or coupling the first comparison input node to a first comparison output node based on first and third control signals;
   a third signal processing unit suitable for storing the tracking signal in a second comparison input node; and
   a fourth signal processing unit suitable for reflecting a reference voltage having a constant voltage level in the second comparison input node or coupling the second comparison input node to a second comparison output node based on second and fourth control signals.

2. The image sensing device of claim 1, wherein the first signal processing unit includes:
   a switching element coupled between an input node of the first convergence voltage and a first coupling node, and switched on and off based on the first comparison result signal;
   a switching element coupled between an input node of the second convergence voltage and the first coupling node, and switched on and off based on the second comparison result signal; and
   a storing element coupled between the first coupling node and the first comparison input node.

3. The image sensing device of claim 1, wherein the second signal processing unit includes:
   a first switching element coupled between an input node of the pixel signal and the first comparison input node, and switched on and off based on the first control signal; and
   a second switching element coupled between the first comparison input node and the first comparison output node, and switched on and off based on the third control signal.

4. The image sensing device of claim 1, wherein the third signal processing unit includes:
   a storing element coupled between a supply node of a ground voltage and the second comparison input node.

5. The image sensing device of claim 1, wherein the fourth signal processing unit includes:
   a first switching element coupled between an input node of the reference voltage and the second comparison input node, and switched on and off based on the second control signal; and
   a second switching element coupled between the second comparison input node and the second comparison output node, and switched on and off based on the fourth control signal.

6. The image sensing device of claim 1, wherein the signal generation circuit includes:
   a comparison unit coupled between the first and second comparison input nodes and the first and second comparison output nodes, and suitable for outputting first and second comparison output signals to the first and second comparison output nodes, respectively, the first and second comparison output signals being obtained by comparing the pixel signal with the tracking signal;
   an amplification unit suitable for amplifying the first and second comparison output signals; and
   a control logic unit suitable for generating the first and second comparison result signals and the image signal based on a result of the amplification of the amplification unit.

7. The image sensing device of claim 6, wherein the comparison unit switches polarities of the first and second comparison input nodes with each other and switches polarities of the first and second comparison output nodes with each other, for each tracking period based on a polarity change signal.

8. The image sensing device of claim 1, wherein the first convergence voltage pulses in a first direction on a basis of a predetermined voltage level for each tracking period, and the second convergence voltage pulses in a second direction opposite to the first direction on a basis of the predetermined voltage level for each tracking period.

9. An image sensing device, comprising:
   a voltage generator suitable for generating a first global convergence voltage where an amount of decrease in a voltage level gradually decreases during a plurality of tracking periods, a second global convergence voltage where an amount of increase in a voltage level gradually decreases during the tracking periods, and a global reference voltage having a constant voltage level;
   a pixel array suitable for generating a plurality of pixel signals; and
   a plurality of signal converters suitable for generating a plurality of image signals based on the pixel signals, the first and second global convergence voltages, the global reference voltage and a plurality of global control signals, wherein each of the signal converters includes:

a tracking circuit suitable for generating tracking signals respectively based on the global control signals, first and second comparison result signals, each of the pixel signals, the first and second global convergence voltages and the global reference voltage; and a signal generation circuit suitable for generating the first and second comparison result signals and each of the image signals based on each of the pixel signals and each of the tracking signals, wherein the tracking circuit includes:

a first signal processing unit suitable for reflecting any one of the first and second global convergence voltages in a first comparison input node based on the first and second comparison result signals;

a second signal processing unit suitable for reflecting each of the pixel signals in the first comparison input node or coupling the first comparison input node to a first comparison output node based on first and second global control signals among the global control signals;

a third signal processing unit suitable for storing each of the tracking signals in a second comparison input node; and a fourth signal processing unit suitable for reflecting the global reference voltage in the second comparison input node or coupling the second comparison input node to a second comparison output node based on third and fourth global control signals among the global control signals.

10. The image sensing device of claim 9, wherein the tracking circuit selectively uses any one of the first and second global convergence voltage for each fracking period to generate each of the tracking signals whose voltage level gradually converges from a voltage level of the global reference voltage to a voltage level of each of the pixel signal.

11. The image sensing device of claim 9, wherein the first signal processing unit includes:

a switching element coupled between an input node of the first global convergence voltage and a first coupling node, and switched on and off based on the first comparison result signal;

a switching element coupled between an input node of the second global convergence voltage and the first coupling node, and switched on and off based on the second comparison result signal; and a storing element coupled between the first coupling node and the first comparison input node.

12. The image sensing device of claim 9, wherein the second signal processing unit includes:

a first switching element coupled between an input node of each of the pixel signals and the first comparison input node, and switched on and off based on the first global control signal; and a second switching element coupled between the first comparison input node and the first comparison output node, and switched on and off based on the second global control signal.

13. The image sensing device of claim 9, wherein the third signal processing unit includes:

a storing element coupled between a supply node of a ground voltage and the second comparison input node.

14. The image sensing device of claim 9, wherein the fourth signal processing unit includes:

a first switching element coupled between an input node of the global reference voltage and the second comparison input node, and switched on and off based on the second global control signal; and a second switching element coupled between the second comparison input node and the second comparison output node, and switched on and off based on the fourth global control signal.

15. The image sensing device of claim 9, wherein the signal generation circuit includes:

a comparison unit coupled between the first and second comparison input nodes and the first and second comparison output nodes, and suitable for outputting first and second comparison output signals to the first and second comparison output nodes, respectively, the first and second comparison output signals being obtained by comparing each of the pixel signals with each of the tracking signals;

an amplification unit suitable for amplifying the first and second comparison output signals; and a control logic unit suitable for generating the first and second comparison result signals and each of the image signals based on a result of the amplification of the amplification unit.

16. The image sensing device of claim 15, wherein the comparison unit switches polarities of the first and second comparison input nodes with each other and switches polarities of the first and second comparison output nodes with each other, for each tracking period based on a global polarity change signal.

17. The image sensing device of claim 9, wherein the first global convergence voltage pulses in a first direction on a basis of a predetermined voltage level for each tracking period, and the second global convergence voltage pulses in a second direction opposite to the first direction on a basis of the predetermined voltage level for each tracking period.

* * * * *